PHONOGRAPH

Filed May 28, 1962

INVENTOR:
JERRY A. MEYER,

BY *Norman C. Fulmer*
HIS ATTORNEY.

3,190,659

PHONOGRAPH

Jerry A. Meyer, Decatur, Ill., assignor to General Electric Company, a corporation of New York Filed May 28, 1962, Ser. No. 198,219
5 Claims. (Cl. 274—2)

This invention relates to phonographs, and particularly to phonographs having a record player arranged to be tilted to a vertical position when not in use.

Certain phonographs are constructed with a record player arranged to be tilted up to a vertical position when not in use, and to be tilted down to a horizontal playing position for use. Such a construction has the advantage of permitting a thin or shallow cabinet for the record player. In a typical tilt-down record player, a pickup or tone arm is provided, which is pivoted near the rear end thereof and which carries a playback needle or stylus near the front end thereof for engaging the groove of a phonograph record. The aforesaid tone arm pivot is necessarily arranged to permit the tone arm to be raised appreciably by lifting up the front end thereof, when desired, to permit inspection or replacement of the needle unit or pickup cartridge. A rest post customarily is provided on the record player, for holding the tone arm in position when at rest. It has been found that a typical user of such a phonograph is apt to forget to fasten down the tone arm on the rest post when the record player is tilted up to the non-playing position, whereby the tone arm flops backwardly with such force that damage may occur to the tone arm or pickup cartridge. Furthermore, if the tone arm is thus tilted back when the record player is tilted down to its playing position, the tone arm may jam against the cabinet thereby resulting in damage to the tone arm and cabinet.

An object of the present invention is to provide means for alleviating the above-mentioned flopping of the tone arm when a tilt-down record player is tilted up to its non-playing position.

Another object is to provide means for restricting the upward movement of a tone arm, and at the same time to permit the tone arm to be raised at will for inspection and replacement of the needle unit and cartridge.

A further object is to provide a tone arm movement restriction means which functions automatically, and which is simple and inexpensive.

Still other objects will be apparent from the following description and claims, and from the drawing in which:

Figure 1:
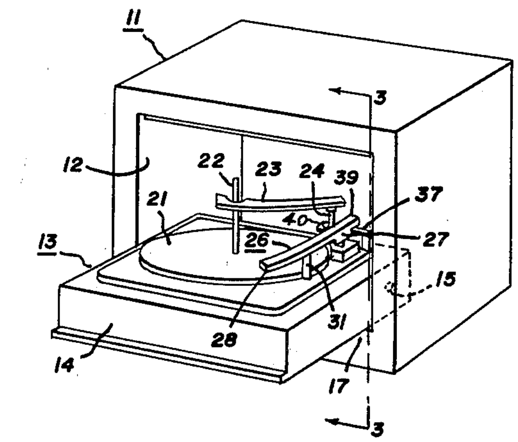
FIG. 1 is a perspective view of a phonograph employing a preferred embodiment of my invention, with the record player in horizontal or operating position.

The invention comprises, briefly, and in a preferred embodiment, a bracket member positioned beneath the rear overhang of the tone arm. This bracket is positioned to permit normal movement of the tone arm for playing records, but to be engaged by the rear overhang of the tone arm whenever the tone arm tends to move up (or back when the record player is being tilted up to the closed position), thereby restraining the tone arm from flopping against objects. The bracket is arranged to extend under only a portion of the operating position range of the tone arm, so that the tone arm, when in a certain horizontal position, can be raised the full extent for inspection or replacement of the stylus or cartridge. The aforesaid horizontal position, at which the tone arm may be raised the full extent, is near the turntable spindle, or near a record-stabilizing "overarm" when in normal position at the spindle.

The preferred embodiment of the invention, as shown in the drawing, comprises a cabinet 11 having an opening 12 in the front thereof for accommodating a record player 13.

The record player 13 preferably comprises a base 14, preferably made of wood and pivotally attached to the cabinet 11 by means of pivots 15 located as shown, so that when the record player 13 is tilted to its closed position, the bottom of the base 14 will be flush with the front of the cabinet 11, and will fill the opening 12. When the record player 13 is titled outwardly and downwardly to its playing position, it pivots about the pivot members 15 to a horizontal position, where it is stopped by any suitable means such as a lip 17 at the lower part of the front opening 12, whereby the base 14 rests on this lip 17 when the record player 13 is in playing position.

A record player frame 18 is mounted on the base 14, and carries a record turntable 21 having a record-centering spindle 22 extending upwardly therefrom in the usual manner. The record player 13 shown is an automatic record changer, and employs an overarm 23 arranged parallel to the surface of the turntable 21 and carried by a vertical post member 24 at the rear end thereof. The overarm 23 is arranged to be raised and swung sideways for loading of records on the spindle 22, in the usual manner, whereupon the overarm is positioned over the top of the stack of records on the spindle 22.

A tone arm is located alongside and above the turntable 21, and is provided with a pivotal support 27 near the rear end thereof, in well-known manner. The pivotal support 27 permits both vertical and horizontal movement of the tone arm, so that a pickup stylus or needle located at the front end 28 of the tone arm can engage and reproduce sound signals from the groove of a phonograph record placed on the turntable 21. The pivot arrangement 27 is usually such that the upper front end 28 of the tone arm may be raised to almost vertical position of the tone arm 26, to permit inspection and replacement of the stylus unit 29 and pickup cartridge. A rest post 31 customarily is provided on the frame 18, and the tone arm 26 customarily is provided with a spring clip or other means for engaging the rest post 31, so that when in rest position the tone arm is held firmly in rest position even when the record player 13 is tilted to the closed or vertical position.

The phonograph thus far described is conventional and well-known. It is found that many people are careless about attaching the tone arm 26 to the rest post 31 before tilting the record player 13 to closed position, thus causing the tone arm to "flop" around and strike against the back 32 of the cabinet 11. This may result in damage to the tone arm and to the pickup cartridge contained in the tone arm. Furthermore, if the tone arm is "floppy" inside the cabinet 11, when the record player 13 is tilted forward and down to playing position, there is risk of the loose tone arm 26 scraping or jamming against the top 33 of the cabinet 11, and of jamming against the upper front lip 34 of the cabinet 11, thereby tending to damage the tone arm, pickup cartridge, and pivot bearings in the pivot arrangement 27.

The present invention comprises a bracket 37, preferably made from sheet metal or plastic, and positioned beneath a rear overhang 39 of the tone arm 26, by such a distance as to permit the tone arm to be raised sufficiently to properly play the phonogragh records, but to prevent the tone arm from flopping up so as to strike the rear 32 of the cabinet 11 or jam against the top 33 or front lip 34 of the cabinet, when the record player is tilted to closed or open position. Preferably, the bracket 37 comprises a piece of sheet metal arranged to be screwed onto the record player frame 18 at a point 40 near the post support 24 for the overarm 23, and may be bent to form a vertical crease 38 in order to increase its rigidity.

Figure 3:
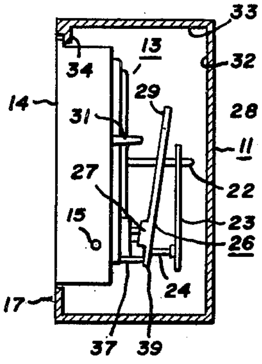
FIG. 3 is a cross-section of FIG. 1 taken on the line 3—3 thereof, with the record player in closed or non-operating position.
Figure 7:
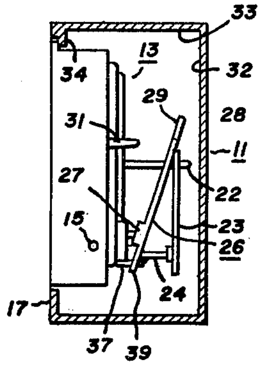
FIG. 7 is a cross-section view of the phonograph in closed position, with the tone arm in a position against the turntable spindle.

FIG. 3 shows how the tone arm 26 is prevented from striking the rear 32 of the cabinet 11, by virtue of the rear overhang 39 of the tone arm 26 bearing against the bracket 37.

Figure 4:
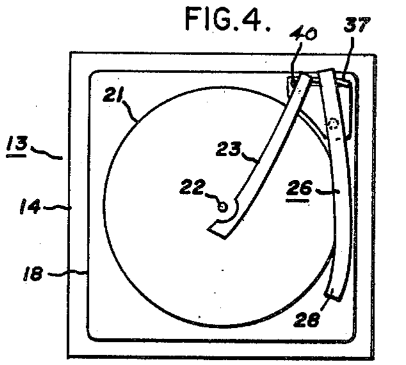
FIG. 4 is a top view of the record player with the tone arm at rest position.
Figure 6:
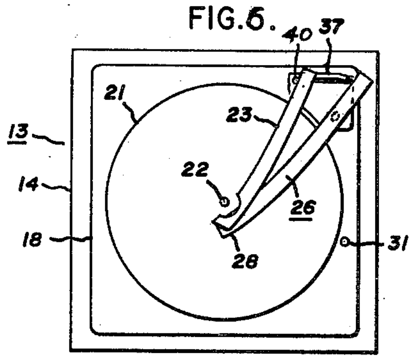
FIG. 6 is a top view of the record player, with the tone arm in a position near the turntable spindle.
Figure 2:
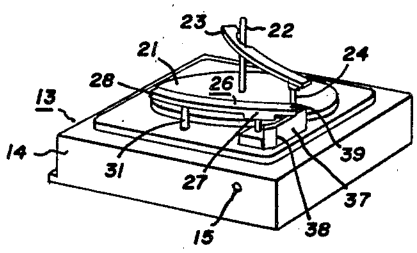
FIG. 2 is a perspective view of the record player portion of the phonograph of FIG. 1, looking toward the right rear thereof.
Figure 5:
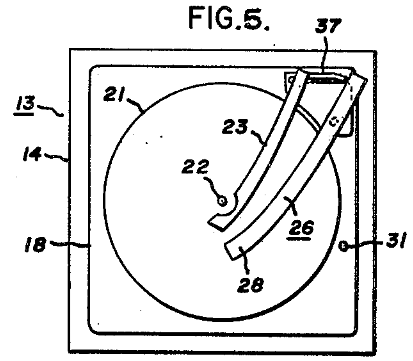
FIG. 5 is a top view of the record player, with the tone arm at a position whereby it may be lifted up for inspection or replacement of the needle unit or pick up cartridge.

In accordance with the invention, the bracket 37 extends only a limited distance under the operating region of the tone arm overhang 39, as shown in FIGS. 4 and 5, whereby the bracket 37 is not beneath the tone arm overhang 39 when the tone arm is in a position near the overarm 23, as shown in FIG. 5. Thus, the tone arm, when in the position shown in FIG. 5, may be lifted up for inspection or replacement of the needle, etc. The bracket 37 is constructed to permit the tone arm to be raised to its full extent at the particular position shown at FIG. 5, because, in accordance with a feature of the invention, the tone arm is not apt to assume this position when the record player 13 is being tilted to closed position; if the tone arm 26 were to swing to the position shown in FIG. 5, it would invariably continue swinging until it comes to rest underneath the overarm 23, as shown in FIG. 6. Usually, when in this position under the overarm, the tone arm 26 will be resting against the spindle 22. When the record player 13 is tilted to closed position with the tone arm in this position as shown in FIG. 6, the overarm 23 will act to restrain the tone arm 26 from flopping around in the cabinet 11.

It should readily be appreciated that, in accordance with my invention, I provide a tone arm restraining bracket 37 which restrains the tone arm 26 from tilting back and striking portions of the cabinet 11 when the record player is tilted to its closed or open position. At the same time, my novel restraining bracket is so dimensioned and positioned as to permit the tone arm to be raised, when desired, by positioning it near but not underneath the operating position of the overarm 23. By thus providing for the raising of the tone arm for inspection or replacement purposes, there is little likelihood of enabling the tone arm to flop around in the cabinet 11 and become damaged, for, as explained above, if the tone arm should assume this position when the record player is being tilted to closed position, the tone arm will invariably continue moving to a position beneath the overarm 23, whereupon the overarm 23 restricts the tone arm movement in the upward and backward direction.

The invention is useful in phonographs not having an overarm, because the bracket 37 restricts the upward movement of the tone arm 26 except when the tone arm is at a position near or against the spindle 22, and when the record player 13 is tilted to the vertical condition with the tone arm at this position, the tone arm will slide backwardly slowly, thereby avoiding damage. Similarly, when the record player is then tilted down to playing position, the tone arm will slide down slowly, thereby avoiding damage. The invention also is useful in portable phonographs which, when picked up by a handle, cause the record player to tilt to a vertical position.

When the restricting bracket 37 is employed in accordance with my invention, it is not necessary to provide for locking the tone arm 26 in rest position on the rest post 31. Thus, the slight added cost of my restraining bracket may be at least partly offset by the elimination of a spring clip on the tone arm 26 for fastening the tone arm to the rest post 31.

While a preferred embodiment of my invention has been shown and described, various other embodiments and modifications thereof will become apparent to those skilled in the art, and will fall within the scope of invention as defined in the following claims.

What I claim is:

1. In a record player arranged to be pivoted about a horizontal axis from a horizontal playing position to a vertical non-playing position within a housing, an elongated tone arm pivotally mounted between front and rear ends thereof on said record player for horizontal and vertical motion of said front end, a needle carried on the front end of said tone arm for playing a record, means for permitting the front end of said tone arm to be raised about its pivotal mounting a substantial distance when said record player is in the horizontal position thereby to permit inspection and replacement of said needle, and structural means coacting with said tone arm near the rear end thereof for limiting the upward movement of said tone arm to an extent permitting the tone arm to play records and at the same time preventing said arm from flopping back to a damaging extent when the record player is pivoted to the vertical position.

2. In a record player arranged to be tilted between a horizontal playing position and a vertical storage position within a housing, said housing including a support, an elongated tone arm pivotally mounted between the ends of said tone arm upon said support, said tone arm including a forward needle-carrying end capable of horizontal and vertical motion for playing a record, said tone arm also including a rear end overhand portion, and a record receiving turntable located on said support alongside of said tone arm for operation in conjunction therewith, said turntable being provided with a record positioning spindle, said forward end of the tone arm extending generally toward the front of said record player when said player is in the horizontal playing position, said tone arm having a rest position alongside said turntable, the pivotal mounting of said tone arm permitting the forward end of the tone arm to be raised a substantial distance to permit inspection and replacement of the needle, the improvement comprising a bracket disposed under the rear end overhang portion of the tone arm for limiting the upward movement of the forward end of the tone arm to an extent permitting the tone arm to play records while at the same time preventing the tone arm from flopping back to an undesirable extent when the record player is tilted to its vertical position, said bracket extending underneath said rear end overhang portion over a range of horizontal movement of said overhang portion corresponding to movement of the forward end of the tone arm from its rest position to a position near said spindle, thereby permitting said tone arm to be raised to its full extent when positioned near said spindle.

3. In a record player arranged to be titled between a horizontal playing position and a vertical storage position within a housing, said housing including a support, an elongated tone arm pivotally mounted between the ends of said tone arm upon said support, said tone arm including a forward needle-carrying end capable of horizontal and vertical motion for playing a record, said tone arm also including a rear end overhang portion, and a record receiving turntable located on said support alongside of said tone arm for operation in conjunction therewith, said turntable being provided with a record positioning spindle and a record stabilizing overarm, said overarm arranged to be positioned adjacent said spindle on the side thereof toward said tone arm, said forward end of the tone arm extending generally toward the front of said record player when said player is in the horizontal playing position, said tone arm having a rest position alongside said turntable, the pivotal mounting of said tone arm permitting the forward end of the tone arm to be raised a substantial distance to permit inspection and replacement of the needle, the improvement comprising a bracket disposed under the rear end overhang portion of the tone arm for limiting the upward movement of the forward end of the tone arm to an extent permitting the tone arm to play records while at the same time preventing the tone arm from flopping back to an undesirable extent when the record player is tilted to its vertical position, said bracket extending underneath said rear end overhang portion over a range of horizontal movement of said overhang portion corresponding to movement of the forward end of the tone arm from its rest position to a position near said overarm, thereby permitting said tone arm to be raised to its full extent when positioned near said overarm.

4. In combination with a record player arranged to be tilted from a horizontal playing position to a vertical non-playing position within a housing, said record player including an elongated tone arm pivotally mounted on said player for vertical and horizontal movement, said record player also including a turntable having a record positioning spindle, said turntable being disposed adjacent said tone arm for conjunctive operation therewith, said tone arm including a forward needle-carrying end, means for permitting said forward end of the tone arm to be raised upwardly about its pivotal mounting a substantial distance to permit inspection and replacement of said needle, and means for limiting the upward movement of said tone arm to an extent permitting the tone arm to play records on said turntable while at the same time preventing the tone arm from flopping back to a damaging extent when the record player is tilted to its vertical position, said last named means being effectual over the normally operative horizontal range of movement of said tone arm except at a position near said spindle.

5. The combination as claimed in claim 4, in which said tone arm extends rearwardly of its pivotal mounting, and in which said last-named means comprises a bracket mounted to extend under the rearwardly extending portion of the tone arm over a portion of the horizontal operative range of motion thereof exclusive of the position thereof when said tone arm is positioned near said spindle.

References Cited by the Examiner

UNITED STATES PATENTS 2,489,146 11/49 Louchheim ______________ 274—2
2,552,757 5/51 Adler __________________ 274—2

LOUIS J. CAPOZI, *Primary Examiner.*

EMIL G. ANDERSON, *Examiner.*